May 29, 1962    G. A. LYON    3,036,867
WHEEL COVER
Filed Nov. 22, 1957    3 Sheets-Sheet 2
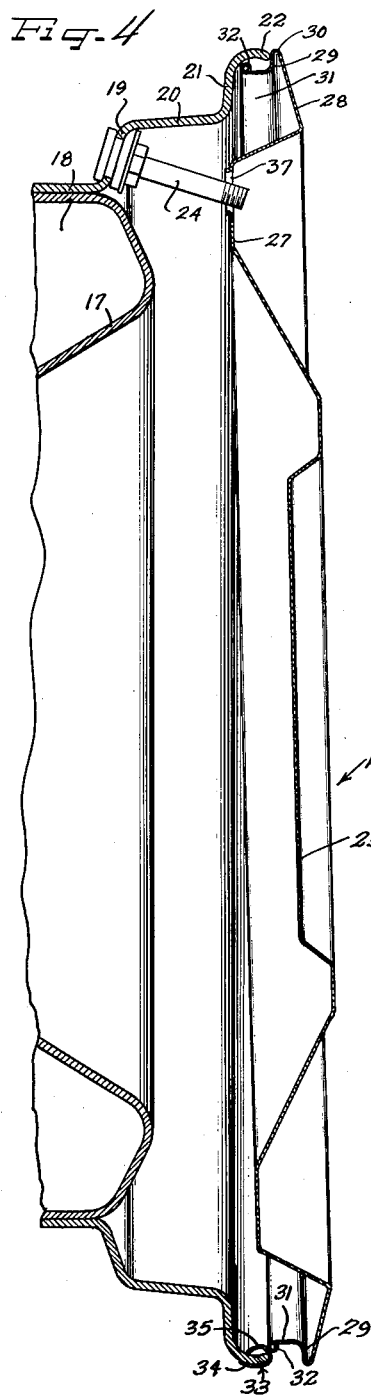
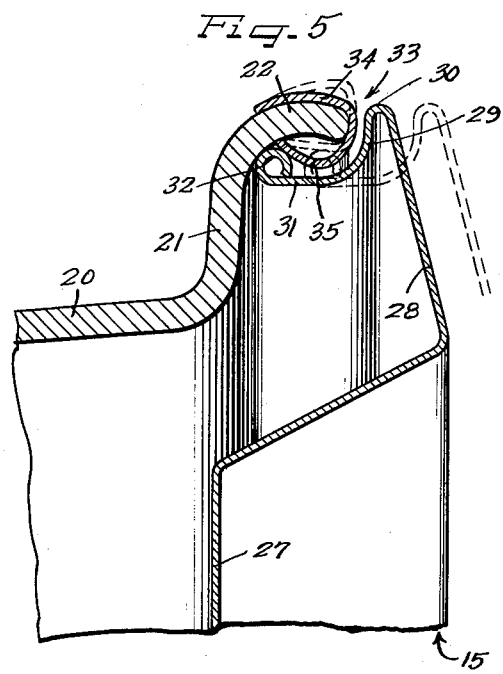
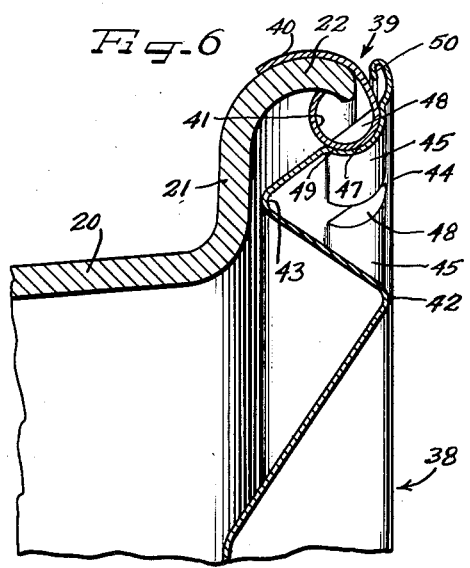
Inventor
GEORGE ALBERT LYON

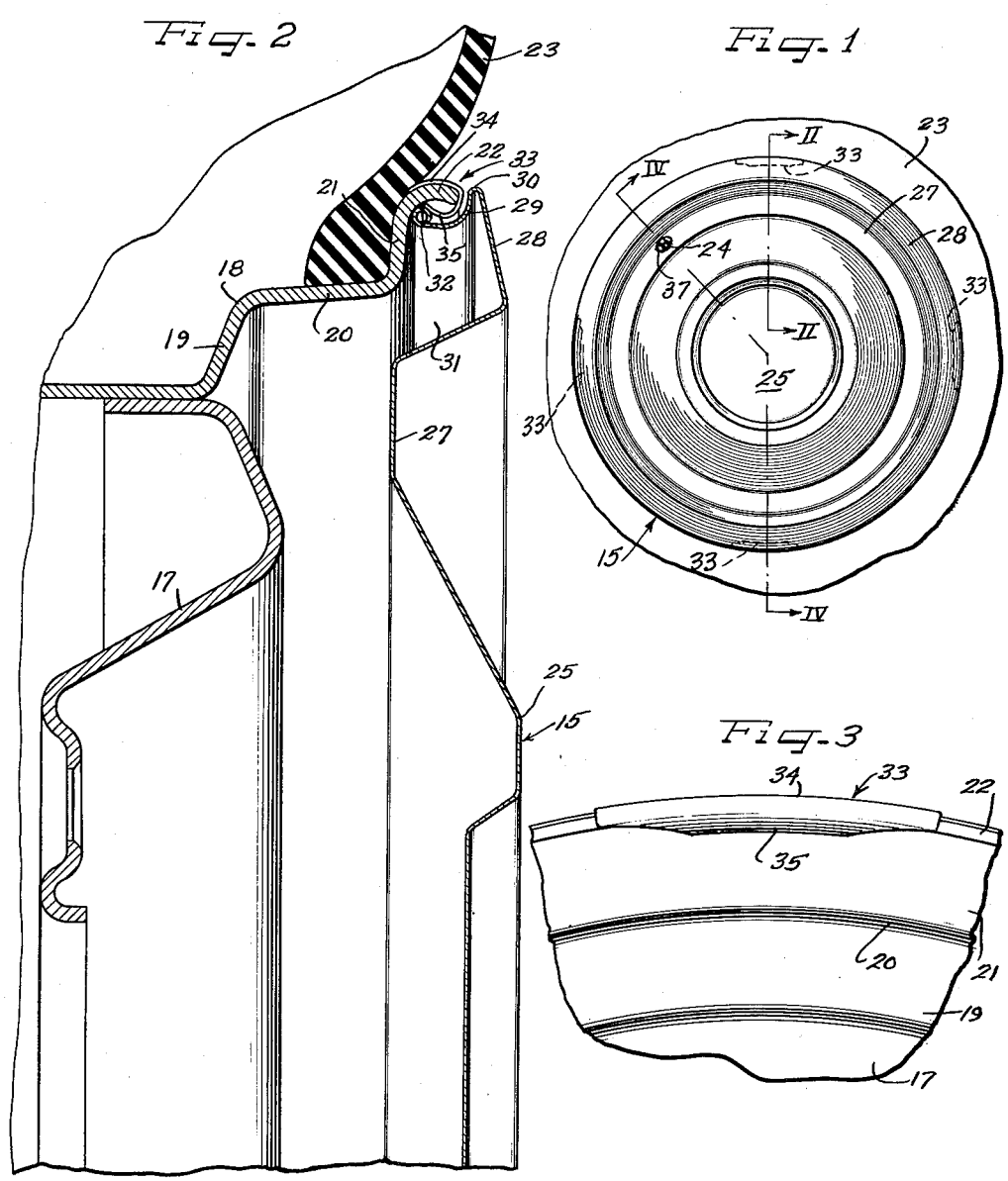

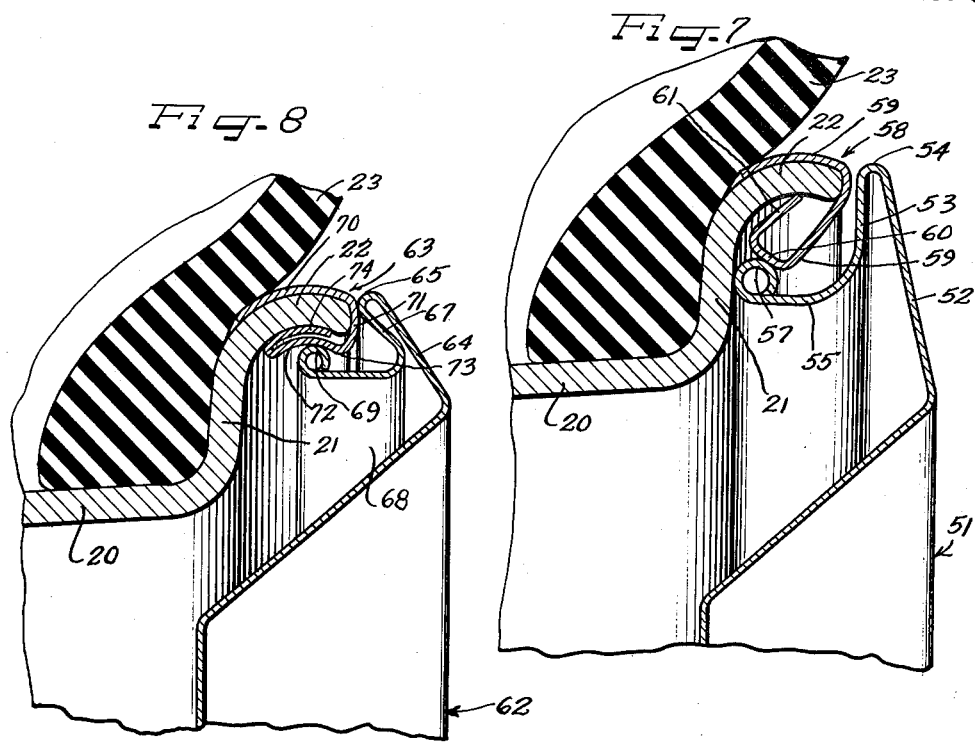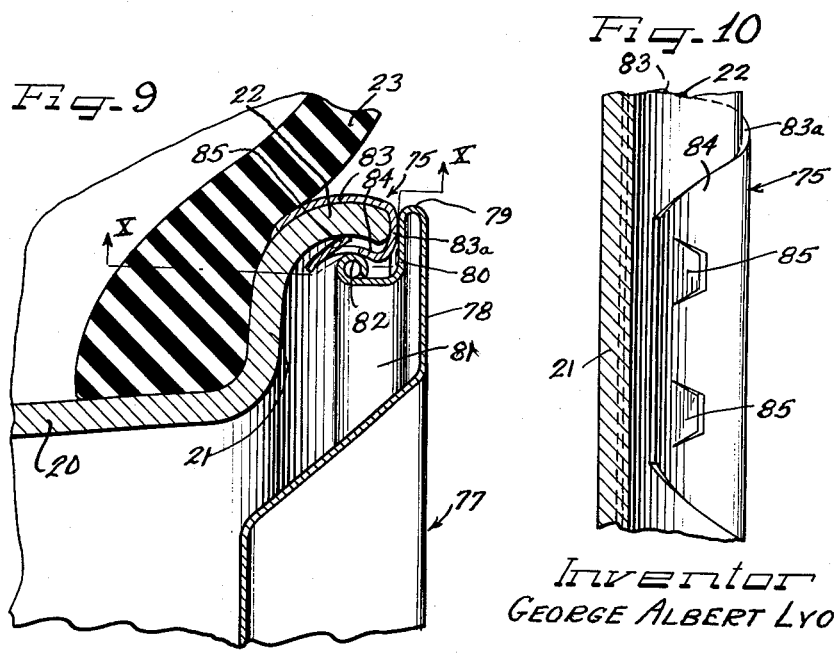

United States Patent Office 3,036,867
Patented May 29, 1962

3,036,867
WHEEL COVER
George Albert Lyon, Detroit, Mich., assignor to Lyon Incorporated, Detroit, Mich., a corporation of Delaware
Filed Nov. 22, 1957, Ser. No. 698,214
1 Claim. (Cl. 301—37)

The present invention relates to improvements in wheel structures and more particularly concerns the ornamental and protective covering of the outer side of vehicle wheels.

With the advent of small size wheels, and more particularly 14 inch wheels with the prospect of even smaller wheels since the indication is that many automobile wheels may eventually be as small as 13 inches, it becomes desirable to have wheel covers extend into substantially completely covering relation to the outer sides of the tire rims inclusive of the terminal flange. Thereby maximum ornamental and protective covering advantage is obtained from the wheel covers.

For economy reasons, it is desirable to maintain to a minimum the material used in production of the covers. For this reason, it is desirable to have retaining means engageable with a retaining structure on the terminal flange of the tire rim. However, with the conventional curved lip type of tire rim, problems are encountered in the adaptation of cover retaining means thereto, and also of the means on the cover relied upon for retaining the cover on the wheel in association with the rim carried retaining means.

It is, accordingly, an important object of the present invention to provide improved means for retaining wheel covers on the outer sides of vehicle wheels, and more particularly in covering relation to the tire rim of the wheel.

Another object of the invention is to provide an improved clip structure for retaining wheel covers on vehicle wheels.

A further object of the invention is to provide cover retaining means for association with the conventional type of tire rim and for receiving wheel covers in press-on, snap-off relation.

It is still another object of the invention to provide retaining means for wheel covers adapted for press-on-pry-off and snapping interengagement and release with respect to substantially rigid or semi-rigid shoulder means on vehicle wheel covers.

Other objects, features and advantages of the present invention will be readily apparent from the following detailed description of certain preferred embodiments thereof taken in conjunction with the accompanying drawings, in which:

FIGURE 1 is an outer side elevational view of wheel structure embodying features of the invention;

FIGURE 2 is an enlarged fragmentary radial sectional detail view taken substantially on the line II—II of FIGURE 1;

FIGURE 3 is a fragmentary side elevational view of the tire rim and one of the retaining clips of FIGURES 1 and 2;

FIGURE 4 is a diametrical enlarged sectional detail view taken substantially on the irregular section line IV—IV of FIGURE 1, and showing how the cover is adapted to be applied to the outer side of the wheel;

FIGURE 5 is a substantially enlarged fragmentary radial sectional detail view similar to FIGURE 2, but showing the structure in better detail;

FIGURE 6 is a fragmentary radial sectional detail view through a wheel structure showing a modification;

FIGURE 7 is a radial sectional detail view showing a further modification;

FIGURE 8 is a similar sectional detail view showing still another modification;

FIGURE 9 is a similar sectional detail view showing yet another modification; and, FIGURE 10 is a fragmentary sectional elevational detail view taken substantially on the line X—X of FIGURE 9.

Referring to FIGURES 1–5, a wheel cover 15 is shown applied to the outer side of a vehicle wheel, such as an automobile wheel including a disc spider wheel body 17 supporting a tire rim 18 of the multiflange, drop-center type including a side flange 19 from which extends an intermediate flange 20, which merges with a terminal flange including a generally radially extending portion 21 and a generally axially outwardly extending curved lip portion 22. A pneumatic tire, such as a tubeless tire 23, is supported by the tire rim and with the tire rim provides an air chamber for air under pressure to maintain the tire inflated. Compressed air is adapted to be supplied to the air chamber by a valve stem 24 carried by the side flange 19.

Although the cover 15 may, if preferred, comprise a multi-part structure including a trim ring portion and a hub cap, and the like, in the present instance, the cover is shown in the generally more economical one-piece disk form including a central crown portion 25 for overlying the central portion of the wheel body and having thereabout an intermediate annular generally dished portion 27 at the radially outer side of which is an axially outwardly offset annular marginal portion 28 of a diameter to overlie the terminal flange inclusive of the flange portions 21 and 22.

At its extremity, the marginal portion 28 has an underturned generally radially inwardly extending flange 29 which at juncture with the marginal portion 28 provides a reinforcing and finishing bead-like or rib-like edge 30 for the cover. The edge 30 is adapted to lie opposite the tip of the terminal flange lip portion 22.

Extending generally axially inwardly from the underturned flange portion 29 is a generally axially extending annular flange 31 terminating in a turned terminal bead 32 projecting generally radially outwardly and adapted in assembly with the wheel to seat on the terminal flange portion 21 adjacent juncture thereof with the lip portion 22 of the rim. For this purpose, the bead 32 is provided on an outside diameter slightly less than the inside diameter of the tip extremity of the tire rim lip portion, and the cover flange 31 is only slightly longer than the length of the terminal flange lip 22, so that in assembly the radially underturned flange portion 29 will lie in fairly close but spaced gap relation to the tip of the terminal flange lip 22.

For retaining the cover on the wheel, the terminal flange lip portion 22 is equipped with a plurality, and in the present instance four, cover retaining spring clips 33 of substantial respective width and provided with radially outer respective legs 34 which are engageable with the outer side of the terminal flange lip 22 in generally conformed hugging gripping relation both axially and circumferentially in the general curvature of the terminal flange lip 22, substantially as shown.

At the radially inner side thereof, the clip 33 in each instance is provided with a resilient loop leg 35 which has a portion that extends across the tip of the terminal flange lip 22 generally radially inwardly, and the clip leg 35 then curves generally axially inwardly and has the terminal edge thereof directed generally radially outwardly and axially inwardly into retaining gripping engagement with the opposing surface at the axially inner side of the inner curved face of the terminal flange lip 22, preferably at a point somewhat spaced axially outwardly relative to the tip or extremity of the outer clip leg 34, substantially as shown in FIGURES 2 and 5. The inner resilient clip leg 35 has a generally inwardly arched or bowed form so as to extend in radially inwardly spaced relation to the adjacent radially inner side of the axially outer portion of the flange lip portion 22. Thereby, also, the clip leg 35 provides a shoulder that projects radially inwardly beyond the innermost tip extent of the terminal flange lip portion 22. The sides of the flange leg 35 of the clip are preferably tapered from a narrower width of approximately half the total width of the clip, so as to afford increased resilient deflectability in the clip leg 35 as compared to the clip leg 34. Moreover, the loop shoulder of the clip leg 35 projects radially inwardly to a smaller diameter than the outside diameter of the cover marginal retaining bead 32. Through this arrangement, application of the cover to the outer side of the wheel in snap-on, pry-off relation to the retaining clips 33 and more particularly the resilient retaining shoulder leg 35 thereof is enabled.

In applying the cover to the outer side of the wheel, referring to FIGURE 4, the wheel cover 15 is moved manually into generally centered relation relative to the outer side of the wheel and preferably in a canted position dipping toward the valve stem 24 in a manner to effect proper registration of the valve stem through a valve stem aperture 37 in the intermediate cover portion 27. As an incident to such canted initial assembly of the cover with the wheel, engagement of the retaining bead 32 behind the shoulder legs 35 of the retaining clips 33 which flank the valve stem 24 is effected with a generally radial assembly movement, thus avoiding the necessity for flexing of the clips in mounting the cover. After valve stem registration and initial assembly as described, the opposite outwardly tilted portion of the cover 15 is pressed axially inwardly to snap the retaining bead 32 past the humped shoulder legs 35 of the clips on the adjacent side of the wheel.

In snapping the bead 32 over and into retaining engagement with the clip humped legs 35, the retaining bead 32 initially engages the substantially radially and axially inwardly angled lead-in surface provided by the axially outer portions of the retaining legs 35 of the clips, substantially as shown at the bottom of FIGURE 4. Then, as axially inward pressure on the adjacent margin of the cover is exerted, the resilient shoulder legs 35 of the clips yield resiliently generally radially outwardly, as indicated in dash outline in FIGURE 5, with possibly a slight resilient yielding of the retaining bead 32, although the primary yielding is accomplished by the retaining clip. During the radial yielding of the clip shoulder hump leg 35, the terminal edge thereof which engaged the tire rim terminal flange portion 22 serves as a biting fulcrum, and the outer leg 34 of the clip rocks to a cooperative extent slightly radially outwardly about its terminus as a fulcrum all as enabled because of the manner in which the clip legs 35 arch over the tip of the terminal flange 22 and into spaced relation radially inwardly therefrom. It will be appreciated, of course, that the resilient yielding of the clip is effected under substantial resilient tension and resistance.

Upon passage of the retaining bead 32 axially inwardly beyond the peak of the shoulder hump of the clip leg 35, the resilient tension loading of the clip effects a substantially snapping reaction, returning the clip legs to their mounted, generally normal terminal flange interengaging relation as shown in full outline in FIGURE 5, and the retaining bead 32 is cammed axially inwardly into the retained relationship, as shown. In this the shoulder provided by the respective shoulder leg 35 of the clip in each instance bears resiliently retainingly against the opposing shoulder afforded by the retaining bead 32, and maintains the retaining bead in centered engagement on the wheel and thrusting against the underlying terminal flange surface against which it is bottomed.

Removal of the cover is readily effected by application of a pry-off tool into the gap between the underturned cover flange 29 and the tip of the terminal flange 22, and application of a pry-off force to snap the retaining bead 32 from engagement with the shoulder flange leg 35 of the adjacent retaining clip or clips. In so doing, the retaining clips will resiliently flex similarly as shown in dash line in FIGURE 5 to release the retaining bead 32.

During service, jarring forces, curbing pressures, and the like are substantially absorbed by the stiffly resilient yielding afforded by the retaining clips and slight resilient yielding that may occur in the retaining bead 32 and the contiguous portions of the cover flange 31.

In the modification of FIGURE 6, details of the wheel are substantially the same as in FIGURE 2, and accordingly, similar reference numerals identify similar parts. In this modification, provision is made for supporting a cover 38 entirely by and upon retaining clips 39 and carried by the terminal flange lip portion 22. For this purpose, the clips 39, of which there may be four disposed equidistantly on the terminal flange similarly as in FIGURE 1, have radially outer wide legs 40 which conformably engage the radially outer side of the terminal flange lip portion 22. On their radially inner side, the retaining clips 39 have respective loop-like retaining shoulder legs 41 dimensioned to extend radially inwardly and axially outwardly relative to and over the tip of the terminal flange lip 22 to provide substantial cover retaining shoulders, and with the terminal edges of the loop legs 41 turned generally radially and axially outwardly and engageable under gripping resilient biting relation against the overhanging inner face portion of the terminal flange lip 22.

For retaining, snap-on, pry-off engagement with the clip loop shoulder legs 41, the cover 38 is provided with a reinforced stiff annular marginal portion including a generally axially outwardly projecting annular radially inner reinforcing ridge rib 42 and a radially outer axially inwardly indented annular reinforcing rib 43 of a diameter to overlie the terminal flange portion 21. At the radially outer side of the rib 43, a generally radially and axially outwardly extending marginal portion 44 is of a diameter to overlie the remainder of the terminal flange including the lip portion 22, and the retaining loop legs 41 of the clips, and is provided with an annular series of outwardly embossed projections 45 affording pockets 47 receptive of the retaining clip shoulder loops 41, and defined at circumferentially opposite sides by respective shoulders 48 opposing the sides of the clip loop legs 41 to retain the cover against turning relative to the retaining clips and the wheel. It will be observed that the depth of the sockets or pockets 47 is such as to afford at the radially and axially inner sides thereof respective interengagement shoulders 49 which are engageable behind the shoulders afforded by the retaining leg loops 41 of the retaining clips while the remainder of the pocket affords a seat for engagement upon the clip leg loop for thereby supporting the cover in spaced relation to the wheel inclusive of the terminal flange 21, 22, substantially as shown. At its outer edge the marginal portion 44 is provided with an underturned reinforcing and finishing edge flange or bead structure 50.

In applying the cover 38 to the outer side of the wheel, similar procedure may be followed as described in connection with FIGURE 4, thereby engaging two of the retaining clip shoulder loops 41 within respective sockets 47 and at opposite sides of the valve stem, and then pressing the cover axially inwardly at the opposite side so that the remaining clips are engaged within respective sockets 47 by camming the clips resiliently to yield and snap into the retaining sockets. In the mounted relation of the cover, the clip loops 41 support the cover in substantially resilient floating cushioned relation.

Removal of the cover is easily effected by application of a pry-off tool therebehind. In this, the indented reinforcing rib 43 affords a convenient pry-off shoulder radially and axially inwardly from the retaining bead sockets 47.

Referring to FIGURE 7, the wheel inclusive of the tire rim and the tire are substantially the same as in FIGURE 2, and similar reference numerals identify similar parts. In this form of the invention, however, a wheel cover 51 including an outer marginal annular portion 52 for overlying the terminal flange has an underturned radially inwardly extending flange 53 projecting around a turned reinforcing rib-like edge 54 to a diameter whereby a generally axially inwardly extending flange portion 55 has a retaining bead 57 thereon engageable with the face of the terminal flange portion 21, spaced radially inwardly from the juncture with the terminal flange lip 22. In this instance, a retaining clip 58 having a large leg 59 engaging conformably at the outer side of the terminal flange lip 22 has a radially inner loop-like retaining leg 59 providing a generally radially and axially inwardly extending cam-in or lead-in portion extending to a slightly larger shouldering diameter than the outside diameter of the retaining bead 57. A turned, generally radially outwardly and axially inwardly extending shoulder 60 at the inner end portion of the clip leg 59 is thrustingly resiliently engageable against the shoulder provided by the retaining bead 57 and has a generally radially and axially outwardly directed biting retaining terminal 61 projecting obliquely in tensioned thrusting engagement with the overhanging shoulder provided by the radially inner side of the terminal flange lip 22.

In applying the cover 51 to the outer side of the wheel, substantially similar action may be taken as described in connection with FIGURE 4. The cover is first canted toward and registered with the valve stem and the adjacent clips 58 and the retaining bead 57 is then snapped over the remaining of the plurality of retaining clips 58. On doing so, the retaining bead 57 is cammed inwardly along the lead in cam portion of the clip legs 59, and the retaining clips yield resiliently to enable snapping of the retaining bead 57 behind the retaining shoulder 60 of the clips which thereupon resiliently tensionably press against the retaining bead and press the same against the terminal flange portion 21.

Removal of the cover 51 is readily effected by applying a pry-off tool to the gap between the underturned flange 53 and the terminal flange and applying pry-off force to remove the cover from one or more of the retaining clips 58. In this instance as in the previously described instances, the clips 58 afford tensioned, shock-absorbing resilient retaining means for the cover.

In the modification of FIGURE 8, a wheel cover 62 is constructed and arranged to be retained on a wheel, similar to FIGURE 2, by a series of cover retaining clips 63 mounted on the lip portion 22 of the tire rim. In this form of the invention the cover 62 has a radially outer annular radially outwardly and axially inwardly marginal portion 64 terminating in a turned edge 65 of a diameter to engage toward the tip of the flange lip 22. Extending generally radially inwardly and axially outwardly from the edge 65 is an underturned annular flange 67 of a diameter to extend to a substantially smaller diameter than the lip flange 22. From the inner terminus of the flange 67 extends generally axially inwardly a retaining flange 68 having a radially outwardly projecting bead 69 adapted to telescopically oppose in spaced adjacent relation the axially outer portion of the lip flange 22 in the assembly, and to engage in press-on, pro-off relation with the retaining clips 63.

In the present instance, the retaining clip 63 includes a radially outer retaining leg 70 which is conformably engageable with radially outer side of the terminal flange lip 22 and is provided at its axially outer side with an inwardly extending intermediate portion 71 engageable with the tip of the terminal flange lip 22. The portion 71 extends radially inwardly slightly beyond the innermost projection of the terminal flange lip and has extending generally axially inwardly a cover retaining leg portion 72 providing at juncture with the intermediate portion 71 a radially inwardly projected shoulder 73 which is of a slightly larger diameter than the outside diameter of the retaining bead 69 of the cover. Thereby the cover bead 69 is adapted to be pressed in snap-on, pry-off relation into and out of retaining engagement behind the retaining shoulder 73, the clip being resiliently yieldable for this purpose and the retaining bead 69 of the cover resiliently co-acting with the retaining leg 72 of the clip and being held in retaining engagement with the clip shoulder by engagement of the turned edge 65 with the tip of the terminal flange lip 22 and the overlying intermediate clip portion 71.

The resiliency of the clip 63 is enhanced and a backed-up tensioned relationship of the retaining leg 72 of the clips is enhanced by provision of a turned-back terminal flange extremity portion 74 extending generally axially outwardly in sprung-apart space relation between the clip leg 72 and the adjacent inside face of the terminal flange lip 22 and bottomed against the lip. The turned-back abutment thrusting leg terminal portions 74 are shorter than legs 72 themselves and the tips of the terminals 74 engage generally bitingly behind the shoulder overhang of the tip portion of the terminal flange lip 22. Through this arrangement, snug resilient tensioned engagement of the retaining bead 69 of the cover by the clip legs 72 is assured.

Application and removal of the cover 62 may be effected substantially as described in connection with FIGURE 4, the clips 63 in the leg portions 72 and the outer leg portions 70 thereof being resiliently, flexibly deflectable for the press-on, pry-off passage of the retaining bead 69 past the shoulder 73.

Referring to the modification of FIGURE 9 and 10, retaining clips 75 are applied to the terminal flange lip portion 22 for retaining on the outer side of the wheel a cover 77, which includes a radially outer marginal portion 78, having a turned edge 79 for overlying the tip of the terminal flange portion 22 and from which extends generally radially inwardly an underturned flange 80 extending to a diameter somewhat smaller than the terminal flange lip 22. Projecting generally axially inwardly from the inner margin of the underturned flange 80 is a generally axially inwardly extending flange 81 substantially shorter than the terminal flange lip 22 and provided with a turned angular retaining bead 82 of an outside diameter slightly smaller than the smallest diameter of the flange lip 22 so that the cover flange 81 and the bead 82 can be generally telescopically received in spaced adjacent relation to the inner side of the flange lip.

In this instance, the retaining clips 75 are provided with outer retaining leg portions 83 engageable conformably with the radially outer side of the terminal flange lip 22 and having at the axially outer ends thereof generally radially inwardly extending intermediate connecting flange portions 83a for seating against the tip of the terminal flange lip 22, and of a width to project slightly radially inwardly beyond the extremity of the flange lip. On the inner end of the intermediate flange portion 83a is a generally axially inwardly extending, radially outward bowed clip leg 84 providing at juncture with the flange 83 an overhanging shoulder of smaller diameter than the outer diameter of the bead 82 so as to receive the cover bead retainingly in snap-on pry-off relation behind such shoulder.

Biting, retaining inter-engagement of the clip leg 84 with the inner side of the terminal flange lip 22 is effected by means of retaining edges that engage the inner face of the lip flange 22 and in the present instance are provided by one or more, a pair being shown, of struck-out tangs 85 directed generally radially and axially outwardly to project beyond the clip leg 84 into and across a narrow space between the opposing faces of the clip leg and the terminal flange lip 22 and engageable within the groove provided by the rim flange lip and more particularly the inturned overhanging shoulder provided by the flange lip. In addition to affording a biting inter-engagement with the lip flange to retain the clip 75 against pulling off of the lip flange, the tangs 85 are of sufficient resilient stiffness to provide spacer means for the clip leg 84 and resilient cushioning, tensioning means for the clip leg in association with the retaining bead 82 of the cover for thereby effectively holding the cover on the wheel.

Application and removal of the cover 77 with respect to the wheel may be accomplished similarly as described in connection with FIG. 4, the retaining clips 75 resiliently yielding to enable press-on, pry-off passage of the retaining bead 82 of the cover past the retaining shoulders of the respective clips.

It will be observed that in all forms of the retaining clips disclosed, edge portions of the clips are bitingly engageable with the inner face of the terminal flange lip, for thereby retaining the clips against dislodgement, especially during pry-off force applied to the cover. Moreover, the tire rim lip engageable terminal portions of the inner clip legs serve as tensioning means for maintaining the clips in position as well as for providing retaining tension for the retaining legs of the clips in association with the retaining bead shoulders of the covers. In all instances the retaining clips have inter-engaging generally axially and radially inwardly facing shoulders that are normally disposed on slightly smaller diameters than the engaged shoulders of the retaining beads of the covers so that by the bottoming of the terminal portions of the retaining legs of the clips against the opposing inner face of the terminal flange lip a strong, resilient, thrusting, gripping retaining interengagement of the inner clip leg shoulders with the cover shoulders is assured.

It will be understood that modifications and variations may be effected without departing from the scope of the novel concepts of the present invention.

I claim as my invention:

In a wheel structure including a tire rim having a generally axially outwardly extending lip flange having radially outer and radially inner sides and a terminal tip, a circumferentially spaced series of resilient cover retaining clips carried by said terminal lip flange, each of the clips having a radially outer leg engageable retainingly with the radially outer side of said lip flange and a radially inner leg curving continuously radially inwardly over said tip and then curvingly turned generally axially inwardly in spaced relation to the tip portion of said lip flange and terminating in a generally radially outwardly extending biting edge retainingly engaging said radially inner side of said lip flange, and a cover member having shoulder means thereon disposed on a diameter slightly greater than the radially innermost projection of said inner legs of the clips and movable past the radially innermost portions of the clips by resliently radially outwardly deflecting the inner clip legs and through said connecting portions said outer clip legs, said shoulder means being defined at the axially inner sides of sockets in the cover member and the sockets providing portions engaging upon axially outwardly facing surfaces provided by said radially inner legs for thereby entirely supporting the cover on said radially inner legs of the clips.

References Cited in the file of this patent

UNITED STATES PATENTS

| | | |
|---|---|---|
| 2,329,854 | Rubsam | Sept. 21, 1943 |
| 2,351,655 | Aske | June 20, 1944 |
| 2,526,026 | Horn | Oct. 17, 1950 |
| 2,569,483 | Lyon | Oct. 2, 1951 |
| 2,621,978 | Lyon | Dec. 16, 1952 |
| 2,624,640 | Lyon | Jan. 6, 1953 |
| 2,749,184 | Wood | June 5, 1956 |
| 2,757,984 | Lyon | Aug. 7, 1956 |
| 2,915,335 | Barnes | Dec. 1, 1959 |
| 2,963,324 | Wood | Dec. 6, 1960 |

FOREIGN PATENTS

| | | |
|---|---|---|
| 1,118,704 | France | Mar. 18, 1956 |